April 19, 1966   S. LAVERGNE   3,246,458
VINE SHREDDER
Filed June 30, 1964
FIG. 1
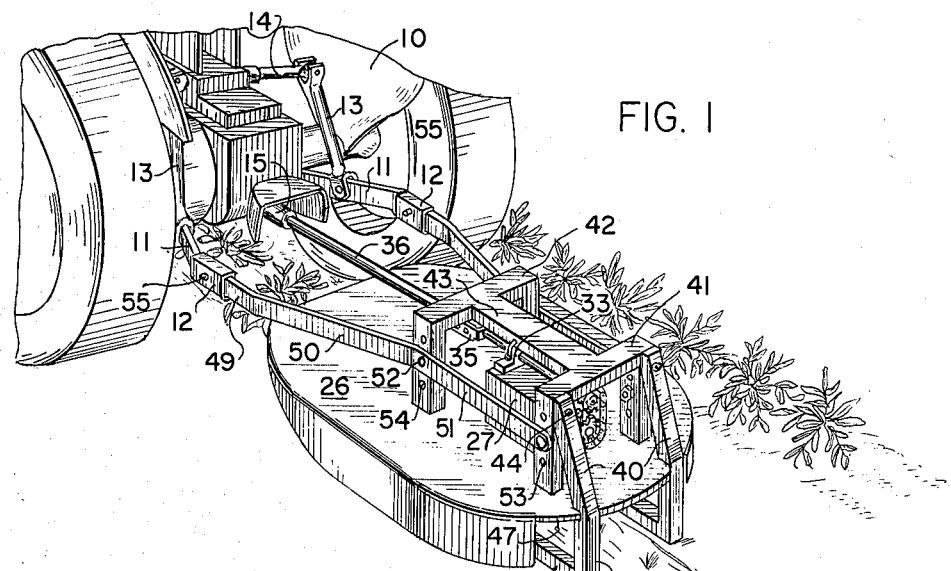
FIG. 2
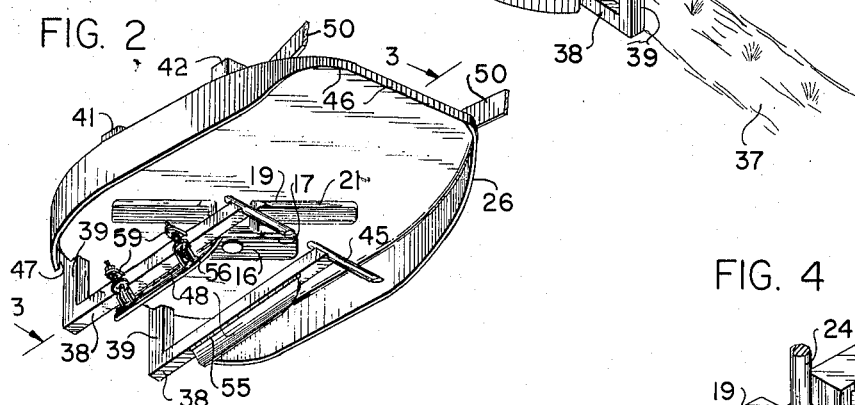
FIG. 3
FIG. 4
FIG. 5
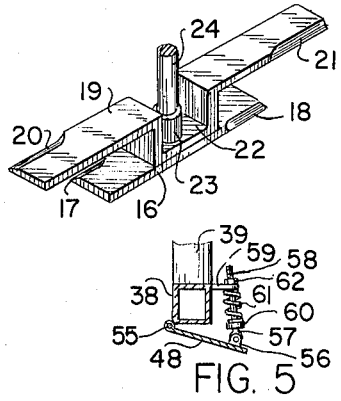
INVENTOR
SERVILLE LAVERGNE
BY *Hyatt Dowell IV*
ATTORNEYS 3,246,458
VINE SHREDDER
Serville Lavergne, Rte. 1, Box 9, Sunset, La.
Filed June 30, 1964, Ser. No. 379,181
8 Claims. (Cl. 56—25.4)

This invention relates to the cultivation of the soil and the performance of other operations in connection therewith, and to machines and equipment utilized in the performance of the several operations and designed to effect a saving in time and labor as well as to accomplish the desired results.

The invention relates particularly to a vine shredder or device for cutting vines and other growth, as well as to a device of this kind which can be readily and easily connected to a tractor or other propelling vehicle and driven from the power take-off thereof for performing the vine shredding or cutting operation.

Vines growing in the field, as well as other growth, have interfered with cultivation and other operations in connection with the soil and have made it desirable to remove such vines by cutting or shredding the same, and this has been undertaken in various ways which involved the expenditure of substantial time, labor, and capital.

It is an object of the invention to provide a vine shredder of simple inexpensive and durable construction, which can be readily attached to a conventional tractor and driven through the power take-off thereof, as well as a vine shredder having a bar-type rotary cutter, mechanism for picking up and feeding the vines into the cutter, and a protective housing therefor open at both ends so that it can travel along a windrow of vines or the like.

Another object of the invention is to provide a vine shredder having skid means by which the cutter may follow the contour of the terrain and the proximity of the cutter to the earth may be controlled and the shredder properly located relative to the row of vines to be shredded.

A further object of the invention is to provide a vine shredder having a frame, a rotary cutter bar, an open-ended protective housing for said cutter bar carried by said frame, skids extending lengthwise in spaced parallel relation in said housing beneath said cutter bar and of a construction to maintain the position of the cutter bar in the housing and control the proximity of the cutter bar to the earth, and means for connecting said frame to a propelling vehicle and for driving said cutter bar from the power take-off of said vehicle.

Other objects and advantages of the invention will be apparent from the following description taken in conjunction with the accompany drawings in which:

FIG. 1 is a perspective illustrating the invention in use;
FIG. 2, a bottom perspective of the device;
FIG. 3, a vertical section on the line 3—3 of FIG. 2;
FIG. 4, a perspective of the cutter bar; and
FIG. 5, an enlarged vertical section on the line 5—5 of FIG. 3.

Briefly stated, the invention is a vine shredder having a pair of prongs for lifting the vines and a rotary cutter bar contained in an open-ended protective housing. The cutter bar is mounted on a shaft extending upwardly through the housing into a gear box, and transmission means is provided from the gear box through a shaft and universal joint to the power take-off of the tractor in a manner to be driven thereform. Means is provided for attaching the device to a tractor including a pair of corresponding arms and a pair of spaced skids are employed for controlling the proximity of the cutter to the earth over which it operates and designed to follow the contour of the terrain.

With continued reference to the drawing, a tractor 10 of conventional construction includes spaced rearwardly extending substantially horizontal arms 11 having sockets 12. The arms 11 are supported by links 13 pivoted to arms 14 so they can be raised and lowered at the will of the operator of the tractor. The tractor has a power take-off 15, the tractor 10 and other parts described being of conventional construction.

The vine shredder of the present invention includes a bar-type cutter composed of a bar 16 having diagonally opposed cutting edges 17 and 18 and a slightly longer bar 19 having diagonal cutting edges 20 and 21. The bar 19 has a central offset portion 22 which engages and is fixed to the bar 16 and spaces apart the bars 16 and 19. The bar 16 cuts the vines initially at or near the earth and the bar 19 additionally cuts and discharges the vines.

The central offset portion 22 of the bar 19 is provided with a sleeve or hub 23 by means of which the cutter is fixed on a shaft 24. This shaft extends through a bearing 25 in a protective housing 26 and into a gear box 27 mounted on the upper surface of the housing. From the gear box there extends a shaft 28 carrying a sprocket 29 driven by a chain 30 from a sprocket 31 on a shaft 32 mounted in pillow blocks 33 secured by fasteners 34 to the top of the gear box 27. The shaft 32 is connected by a universal coupling 35 and a shaft 36 to the power take-off 15 of the tractor 10.

In order that the cutter may follow the contour of the terrain at each side of a hill or ridge 37 in which plants or growth are located, a pair of spaced generally parallel and horizontal skids 38 are provided which are adapted to rest upon the terrain. Such skids have rear posts 39 which extend upwardly the height of the housing 26 and then they are provided with slightly inclined forward portions 40 which engage and are connected to the rear of a pair of spaced inverted generally U-shaped brackets 41 and 42. The brackets 41 and 42 are centrally connected by a bar 43.

The U-shaped brackets have their free ends fixed to the housing 26 in any desired manner, and the forwardly inclined bar portions 40 are secured to bolts 44 to the bracket 41. This construction provides a rigid frame on top of the housing to which the skids 38 are fixed in spaced generally parallel relation.

Each of the skids is provided at its free forward end with a downwardly inclined prong or finger 45 which extends downwardly sufficient to travel beneath the vines and lift or cause them to travel upwardly into a position to be engaged by the cutting edges 17 and 18 of the bar 16 and upon further elevation to be cut by the cutting edges 20 and 21 of the bar 19 as the vines travel into the open front end 46 of the housing and prior to their passage through the opening 47 in the rear end of the housing.

As illustrated in FIGS. 2 and 5 the skids 38 have sideboards 48 adjustably mounted thereon which causes the vine shredder to follow the hill or ridge. Each of the sideboards is connected by a hinge 55 along one side to a skid 38 and the opposite side of each sideboard has two pairs of upstanding lugs 56. Each pair is connected by a pivot 57 to the eye of a bolt 58. The bolt extends upwardly through an ear 59 mounted on the skid 38. In order to provide adjustability for the sideboards a collar 60 is fixed to the bolt 58 adjacent to the eye thereof and a spring 61 is disposed between the collar 60 and the ear 59. Preferably a nut 62 threadedly engages the bolt 58 on the opposite side of the ear 59 so that a predetermined tension can be applied to the spring 61 and the sideboard 48 can be disposed on a predetermined angle.

It will be apparent that a device is provided which readily may be moved along the hill on which vines or growth is located readily to cut or shred such vines or growth. This cutting may include the detachment of tops of vegetation or the like which grows beneath or above the surface of the soil. The skids 38 follow the contour of the terrain and control the proximity of the cutting blades 16 and 19 to the edge of the earth.

As previously indicated power for driving the cutters may be derived from the power take-off 15 through the shaft 36 or from other source. In order to connect the device to a tractor a pair of spaced arms are provided having forward parallel portions 49 which fit into the sockets 12. The parallel portions 49 merge with inclined portions 50 which join straight rear portions 51. The straight rear portions are adjustably connected by set screws 52 with each of the brackets 41 and 42, the brackets having spaced openings 53 and 54 so that the bolts 52 may be adjusted to dispose the straight portion 51 in substantially horizontal position as illustrated in FIG. 1, or to dispose such horizontal portion at an angle to the upper surface of the housing 26 to cause raising and lowering of the skids 38.

It will be apparent from the foregoing that a relatively simple inexpensive and durable cutter or shredder is provided of relatively few parts which will satisfactorily perform the functions for which it was designed, and such shredder or cutter may be easily attached to the tractor by inserting the arms 49 in the sockets 12 and securing them therein by tightening set screws 55, and at the same time connecting the drive shaft 36 with the power take-off of the tractor.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A vine shredder comprising
a body member generally parallel to the ground,
draft means for attachment of said body member to a propelling vehicle,
skid means for supporting the weight of the entire structure comprising a pair of downwardly extending portions fixed to said body member and forwardly extending ground engaging portions generally parallel to the said body member rigidly fixed to each downwardly extending portion and generally parallel to each other and defining with said body member a vine receiving space opening to the front and the sides of the skid means,
each ground engaging portion having a downwardly and forwardly extending projection at the front thereof to pick up vines disposed in random directions along the ground as the device is pulled forward to lift them into the said vine receiving space across the tops of the skid means from beyond the outer sides of the skid means,
an upright cutter shaft rotatably mounted on said body member between the forwardly extending portions of said skid means, a cutter mounted on said cutter shaft for rotation within the space between said skid means and said member and in a path which intersects an imaginary vertical projection of each forwardly extending portion of said skid means, and
means operatively connected to the power take-off of the propelling vehicle for rotating said shaft.

2. The structure of claim 1 in which said body member includes a housing having
 (a) a generally flat top member overlying said cutter and
 (b) a pair of side members
  1. one secured to each side of the top member
  2. spaced outwardly from the forwardly extending portion of the skid means on that side
  3. extending substantially parallel to said forwardly extending portion
  4. extending downwardly toward the forwardly extending portion
  5. to define a vine receiving space between each side member and the associating forwardly extending portion open to the front and free of obstructions.

3. The structure of claim 1 in which means are provided to angularly adjust the body members relative to the horizontal plane about an axis transverse to the direction in which the skid means extend.

4. A vine shredder comprising
a body member generally parallel to the ground,
draft means for attachment of said body member to a propelling vehicle,
skid means for supporting the weight of the entire structure comprising a pair of downwardly extending portions fixed to said body member and forwardly extending portions generally parallel to the said body member,
rigidly fixed to each downwardly extending portion and generally parallel to each other and defining with said body member a vine receiving space opening to the front and the sides of the skid means,
each skid having a downwardly and forwardly extending projection at the front thereof to pick up vines disposed in random directions along the ground as the device is pulled forward to lift them into the said vine receiving space across the tops of the skid means from beyond the outer sides of the skid means,
an upright cutter shaft rotatably mounted on said body member between said skid means, a first cutter mounted on said shaft and a second cutter mounted for rotation in a generally horizontal plane between the skid means and below the body member on said shaft parallel to and above the first cutter for rotation in a path which intersects the imaginary vertical projection of each forwardly extending portion of said skid means and
means operatively connected to the power take-off of the propelling vehicle for rotating said shaft.

5. A vine shredder comprising
a body member generally parallel to the ground,
draft means for attachment of said body member to a propelling vehicle,
a pair of skids attached to the lower side of said body member, each skid comprising a downwardly projecting portion fixed to the frame, and a forwardly extending portion parallel to the frame, said downwardly and forwardly projecting portions of said skids being generally parallel to each other and defining with said body member a vine receiving space opening to the front and the sides of the skids, a surface contacting member mounted for angular movement on the lower side of each skid member about an axis parallel to the direction in which the skid member extends, and means for adjusting the angular position of said surface contacting member relative to its associated skid member,
each skid having a downwardly and forwardly extending projection at the front thereof to pick up vines disposed in random directions along the ground as the device is pulled forward to lift them into the said vine receiving space across the tops of the skids from beyond the outer sides of the skids,
an upright cutter shaft rotatably mounted on said body member between said skids, a cutter mounted on said cutter shaft for rotation within the space between said skids and said member, and
means operatively connected to the power take-off of the propelling vehicle for rotating said shaft.

6. A vine shredder comprising
a body member generally parallel to the ground,
draft means for attachment of said body member to a propelling vehicle,
a pair of skids attached to the lower side of said body member, each skid having a downwardly extending portion fixed to said body member and a forwardly extending portion generally parallel to the said body member, said downwardly and forwardly projecting portions of each skid being generally parallel to each other and defining with said body member a vine receiving space opening to the front and the sides of the skids, surface containing members mounted for angular movement on the lower side of each skid member about an axis parallel to the direction in which the skid member extends, and resilient means between the skid member and the surface contacting member to bias the same apart, each skid having a downwardly and forwardly extending projection at the front thereof to pick up vines disposed in random directions along the ground as the device is pulled forward to lift them into the said vine receiving space across the tops of the skids from beyond the outer sides of the skids, an upright cutter shaft rotatably mounted on said body member between said skids, a cutter mounted on said cutter shaft for rotation within the space between said skids and said member, and means operatively connected to the power take-off of the propelling vehicle for rotating said shaft.

7. A vine shredder comprising a body member generally parallel to the ground, draft means for attachment of the body member to a propelling vehicle, including a first pair of members secured to the body member along a first transverse line and projecting upwardly therefrom, a second pair of members secured to the body member along a second transverse line behind the first transverse line and projecting upwardly from the frame, a pair of draft members each connected to one of the first pair of upwardly extending members and to one of the second pair of upwardly extending members, means to selectively connect each draft member to vertically spaced positions on at least one of the upwardly extending members, and draft means on each draft member for attachment to a propelling vehicle, skid means for supporting the weight of the entire structure comprising a pair of downwardly extending portions fixed to said body member and forwardly extending portions generally parallel to the said body member, rigidly fixed to each downwardly extending portion and generally parallel to each other and defining with said body member a vine receiving space opening to the front and the sides of the skid means, each skid means having a downwardly and forwardly extending projection at the front thereof to pick up vines disposed in random directions along the ground as the device is pulled forward to lift them into the said vine receiving space across the tops of the skid means from beyond the outer sides of the skid means, an upright cutter shaft rotatably mounted on said body member between said skids, a cutter mounted on said cutter shaft for rotation within the space between the forwardly extending portions of said skid means and said member and in a path which intersects an imaginary vertical projection of each forwardly extending portion of said skid means, and means operatively connected to the power take-off of the propelling vehicle for rotating said shaft.

8. A vine shredder comprising a body member generally parallel to the ground, draft means for attachment of the body member to a propelling vehicle, including a first pair of members secured to the body member along a first transverse line and projecting upwardly therefrom a second pair of members secured to the body member along a second transverse line behind the first transverse line and projecting upwardly from the frame, a pair of draft members each connected to one of the first pair of upwardly extending members and to one of the second pair of upwardly extending members, means to selectively connect each draft member to vertically spaced positions on at least one of the upwardly extending members, and draft means on each draft member for attachment to a propelling vehicle, a pair of skids attached to the lower side of said body member, each skid comprising a downwardly projecting portion fixed to the frame, and a forwardly extending portion parallel to the frame, said downwardly and forwardly projecting portions of said skids being generally parallel to each other and defining with said body member a vine receiving space opening to the front and the sides of the skids, a surface contacting member mounted for angular movement on the lower side of each skid member about an axis parallel to the direction in which the skid member extends, means for adjusting the angular position of said surface contacting member relative to its associated skid member, and resilient means between each skid member and the associated surface contacting member to bias the same apart, each skid having a downwardly and forwardly extending projection at the front thereof to pick up vines disposed in random directions along the ground as the device is pulled forward to lift them into the said vine receiving space across the tops of the skids from beyond the outer sides of the skids, an upright cutter shaft rotatably mounted on said body member between said skids, a first cutter mounted on said shaft, a second cutter mounted on said shaft above the first cutter, each cutter being mounted in the space between the skids and the body member for rotation with said shaft, means operatively connected to the power take-off of the propelling vehicle for rotating said shaft, and said body member including a housing having a generally flat top member overlying said cutter, a downwardly extending side portion secured to said top member and spaced outwardly from each skid member and extending substantially parallel to said skid members.

References Cited by the Examiner

UNITED STATES PATENTS

| | | | |
|---|---|---|---|
| 7,656 | 9/1850 | Morrison | 172—680 X |
| 128,734 | 7/1872 | King | 172—680 X |
| 1,596,334 | 8/1926 | Bullock | 172—393 |
| 1,629,356 | 5/1927 | Myers | 172—391 |
| 2,505,952 | 5/1950 | Fergason. | |
| 2,621,457 | 12/1952 | Rosenberg | 56—25.4 |
| 2,649,678 | 8/1953 | Sishc | 56—25.4 |
| 2,688,221 | 9/1954 | Giescbrecht | 56—25.4 |
| 2,815,631 | 12/1957 | Northcote et al. | 56—25.4 |
| 2,821,831 | 2/1958 | Thompson | 56—25.4 |
| 2,968,354 | 1/1961 | Berry | 172—28 |
| 2,977,741 | 4/1961 | Stroman | 56—25.4 |
| 3,136,108 | 6/1964 | Wood | 56—25.4 |

ABRAHAM G. STONE, *Primary Examiner.*

RUSSELL R. KINSEY, ANTONIO F. GUIDA,
*Examiners.*